United States Patent [19]

Mackrle et al.

[11] 4,139,457

[45] Feb. 13, 1979

[54] METHOD OF AND APPARATUS FOR PURIFYING WASTE WATER

[75] Inventors: Svatopluk Mackrle, Brno; Vladimir Mackrle, Prague; Oldrich Dracka, Brno, all of Czechoslovakia

[73] Assignee: Agrotechnika, narodny podnik, Zvolen, Czechoslovakia

[21] Appl. No.: 863,427

[22] Filed: Dec. 22, 1977

Related U.S. Application Data

[63] Continuation-in-part of Ser. No. 720,510, Sep. 3, 1976, abandoned.

[30] Foreign Application Priority Data

Sep. 3, 1975 [CS] Czechoslovakia ............... 5998/75

[51] Int. Cl.² .................... C02B 3/06; B01D 21/26
[52] U.S. Cl. ............................. 210/20; 210/194; 210/202; 210/208; 210/220; 210/261
[58] Field of Search ............... 210/7, 20, 194, 195 R, 210/195 S, 220, 221 R, 261, 519, 540, 201, 202, 205, 208, 262

[56] References Cited

U.S. PATENT DOCUMENTS

| 1,900,809 | 3/1933 | Hammerly | 210/194 |
|---|---|---|---|
| 2,378,799 | 6/1945 | Sebald | 210/194 X |
| 3,043,433 | 7/1962 | Singer | 210/221 R X |
| 3,346,122 | 10/1967 | Cornelissen | 210/540 X |
| 3,403,096 | 9/1968 | Mackrle et al. | 210/20 |
| 3,489,287 | 1/1970 | Streander | 210/525 |
| 3,627,136 | 12/1971 | Mackrle et al. | 210/519 X |
| 3,815,750 | 6/1974 | Mackrle et al. | 210/261 X |
| 4,008,153 | 2/1977 | Mackrle et al. | 210/261 X |
| 4,011,163 | 3/1977 | Fairbanks | 210/261 X |

*Primary Examiner*—Robert H. Spitzer

[57] ABSTRACT

An improved technique for reprocessing, through a reaction zone, a portion of an agitated flow of waste water that is coupled into a wedge-shaped or frusto-conical separating zone via such reaction zone is described. A recirculation conduit, independent of an inlet aperture at the bottom of the separating zone for admitting an upward flow of water from the separating zone, has an inlet end communicating with the separating zone at an upper region thereof, the outlet of the recirculation zone emptying into the agitated water stream in the reaction zone. The inlet aperture at the bottom of the separating zone has a cross-sectional area which is small relative to the cross-sectional area of the separating zone and small relative to the cross-sectional area of the reaction zone. The resulting pressure drop between the inlet aperture at the bottom of the separating zone and the outlet of the recirculation conduit prevents impurities in the separation zone from returning to the reaction zone through the inlet opening.

10 Claims, 6 Drawing Figures

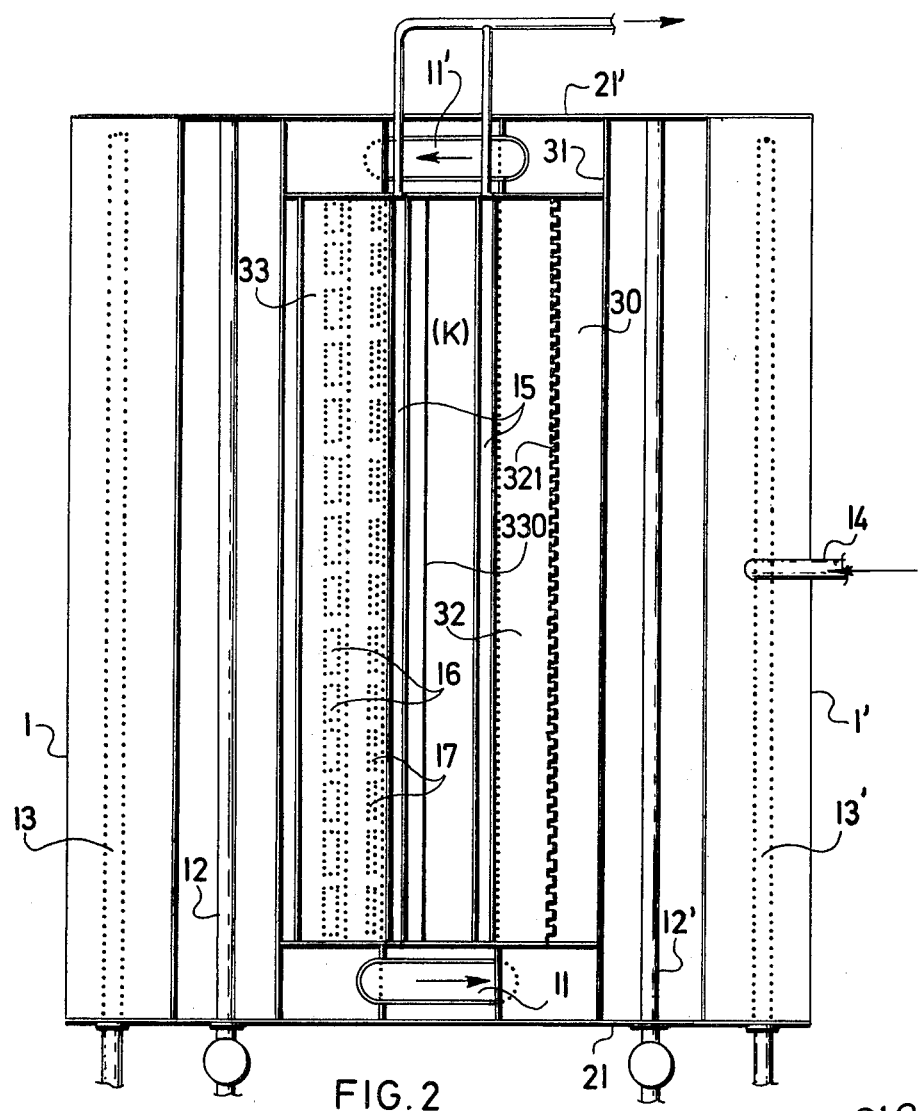
FIG. 2
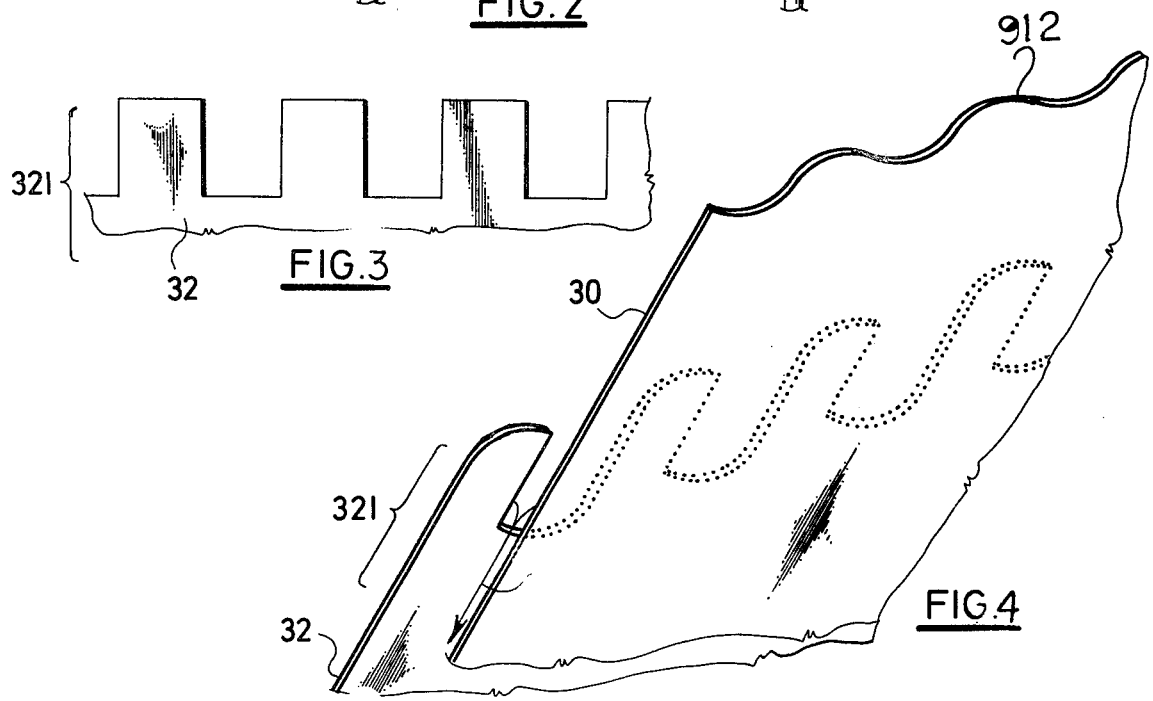
FIG. 3
FIG. 4

METHOD OF AND APPARATUS FOR PURIFYING WASTE WATER

BACKGROUND OF THE INVENTION

This application is a continuation-in-part of application Ser. No. 720,510, filed Sept. 3, 1976, now abandoned.

The invention relates to facilities for the purification of waste water via fluid filtration in a separating zone.

In known arrangements of this type, waste water to be purified is introduced into a reaction vessel in which is disposed a wedge-shaped or frusto-conical separating zone which has an inlet opening in its lower portion and a pure-water discharge conduit at its upper end. Waste water to be purified is introduced into a reaction zone at least a portion of which is disposed below the separating zone and the water in the reaction zone is aerated and/or otherwise agitated to form transverse swirls within the reaction zone. The suspension created by the swirls is coupled, in part, into the separation zone through the inlet aperture. The bulk of the impurities in the suspension are separated in the separating zone; the purified water exits from the discharge channel at the top of each zone, while a portion of the separated impurities in the zone drop back via gravity through the inlet aperture into the reaction zone, to be reprocessed.

The passage of the suspension-bearing waste water upwardly through the separating zone causes the suspension to create, in each zone, a floating floccular bed, resulting in a separation of the suspension. Because of the above-mentioned dropback by gravity of the separated suspension through the zone, the floccular bed is prevented from providing a highly efficient filter action. Consequently, for any given degree of purification desired in the output clean water from the installation, the size of the various zones, and thereby the total expense of the reaction vessel, is relatively large.

SUMMARY OF THE INVENTION

Such disadvantage is overcome by the method of and apparatus for purifying waste water in accordance with the invention. In this technique, the above-mentioned dropback, by gravity, of a portion of the suspension separated in the separating zone through the inlet aperture is completely avoided with the provision of a recirculation conduit extending from an upper portion of the separating zone below the clean-water discharge conduit, the outlet of such recirculating conduit emptying into the transversely swirling, suspension-borne waste water in the reaction zone.

Because of various factors such as the relatively high fluid flow at the outlet of the recirculation conduit compared to the relatively slow flow of waste water introduced into the separation zone, together with factors such as the decrease in upward flow rate of the suspension as it traverses the steadily increasing cross-section of the separating zone, along with the weight of the column of fluid in the recirculation conduit, the fluid pressure in the system drops between the inlet aperture at the lower end of the separating zone and the outlet of the recirculation conduit. As a result, the suspension is automatically fed back into the reaction chamber via the recirculation conduit and not via the inlet aperture. Because of this, the floating floccular bed in the separation zone remains undisturbed, and an optimum filtering action results.

Several arrangements for carrying out such improved process are described. In one embodiment, the reaction zone is formed by a pair of coextensive, longitudinally extending cylindrical channels, which are interconnected at their opposite ends. In addition, the converging walls of the separating zone are positioned between transversely confronting upper portions of the channels through their length, with the wall extending from the second channel being projected beyond the end of the opposite boundary wall to terminate within the first channel. Agitated waste water within the first channel is introduced, via a braking section, into the bottom of the separating zone through an inlet opening formed between the end of the boundary wall at its upper end and the projecting opposed wall of the separating zone. The separated suspension overflows into the top of a channel formed between the boundary wall on the upper portion of the second cylindrical channel and a second guide wall parallel thereto, to be discharged into the lower portion of the first channel for reprocessing. In such case, the incoming waste water empties into the second channel.

In another embodiment, the reaction chamber is in the form of a vertically disposed cylinder, and the walls of the separating zone collectively define a downwardly converging truncated cone in the upper portion of such cylinder. Agitated water in the reaction zone, which constitutes the remainder of the interior of the cylinder, is introduced into the separating zone via an annular inlet opening formed between the inner ends of the converging boundary walls of the zone and an exterior surface of a double-conical section supported coaxially within such separating zone to constitute the recirculation channel. In such case, the separated suspension in the separating zone overflows into a central cylindrical channel within the double conical section, to emerge from the bottom of the section and into the reaction zone.

In a further embodiment, in which the same type of vertically disposed cylinder constitutes the reaction vessel, the separating zone is again a downwardly converging truncated cone, while the reaction zone is a corresponding, upwardly converging truncated cone having its lower wall coincident with the bottom wall of the cylinder. The confronting lower ends of the separating and reaction zones are coextensive, and are disposed in abutting relation to constitute the interface for the inlet channel of the separating zone. The remainder of the interiorof the reaction vessel below the height of the clean-water overflow of the separating zone constitutes a concentrating zone, in the upper part of which a decanting area is provided to extract an additional quantity of fresh water. In this embodiment, the recirculation conduit is a cylindrical portion extending downwardly from the separating zone and terminating within the reaction zone concentric with the axis of the reaction vessel.

BRIEF DESCRIPTION OF THE DRAWING

The invention is further set forth in the following detailed description of preferred embodiments of the apparatus of the invention taken in conjunction with the appended drawing, in which:

FIG. 2 is a plan view of the arrangement of FIG. 1;

FIG. 3 is a representation of a pattern of rectangular serrations formed on an inlet portion of a recirculation conduit suitable for use in the arrangement of FIGS. 1 and 2;

FIG. 4 is a perspective view of an undulatory construction of the opposed walls of a recirculation conduit suitable for use in the arrangement of FIGS. 1 and 2;

DETAILED DESCRIPTION

Figure 1:
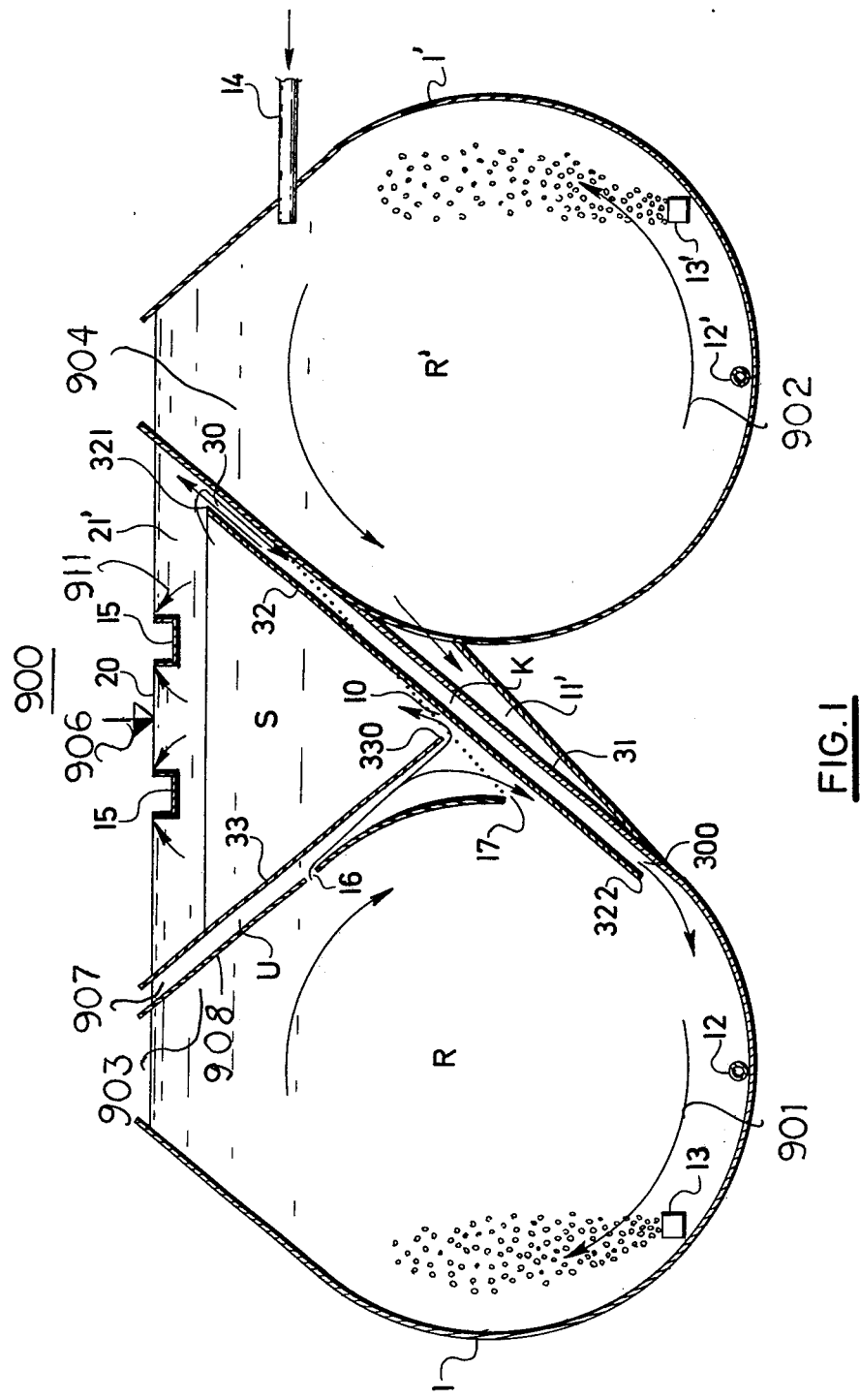
FIG. 1 is a cross-sectional view of a two-chamber embodiment of a water purifying apparatus constructed in accordance with the invention.

Referring now to the first embodiment of the invention shown in FIG. 1, a pair of horizontally extending, longitudinally coextensive generally cylindrical channels 1, 1' constitute separate but interconnected reaction zones R, R' of a purification apparatus indicated generally at 900. Each of the channels 1, 1' has disposed at a lower portion thereof the outlet of a conventional aerating channel 13, 13', which is connected (by means not shown) with a suitable air pressure fitting. In addition, the respective channels 1, 1' have sludge discharge conduits 12, 12' at the bottom thereof, through which excess sludge separated from the waste water to be purified may be periodically removed from the apparatus 900.

Waste water to be purified is conducted into the interior of the reaction chamber R' defined by the channel 1' via an inlet conduit 14. The water introduced into the reaction channel R' flows along the length of the channel 1', and is coupled into the opposed channel R by means of a conduit 11' (FIG. 2) adjacent an end wall 21' of the channel system 1, 1'. Similarly, water in the channel R is coupled into the channel R' via a second conduit 11 near the opposed end wall 21 of the channel system 1, 1', thereby providing a continual longitudinal circulation of water through the reaction zones.

In addition, in each of the reaction zones R, R' the aeration of the channel contents via the conduits 13, 13' will be effective to saturate the waste water with oxygen and also to effect an agitation of the water therein in the form of rapidly moving transverse swirls identified as 901 and 902, respectively, such agitation serving to form the impurities in the water into a froth-like suspension.

A generally wedge-shaped separating zone S is provided between and in communication with transversely confronting upper portions 903, 904 of the channels 1, 1'. The separating zone is adapted, in a conventional manner, to receive an upward flow of waste water from the reaction channels, wherein the upwardly flowing water with the suspension thereon is formed into a floccular filter bed, which serves in separating the suspension-borne impurities as the water passes upwardly through the zone S. Purified water at the top of the zone S, exhibiting a level represented at 906, is discharged from the apparatus 900 via discharge conduits 15. The separated impurities are coupled back into the reaction zones for further reprocessing in the manner described below.

The separating zone S is bounded by a pair of downwardly converging, transversely spaced boundary walls 31, 33, which respectively extend through the regions 903, 904 in a manner generally tangent to the cylindrical portion of the wall of the respective channels 1, 1'. The right-hand boundary wall 31 projects beyond a spaced lower end 300 of the left-hand wall 33 to terminate in a lower right-hand region of the opposed channel 1. A relatively small aperture 10, defined in the lower portion of the separating zone S between the lower end 330 of the wall 33 and the other wall 31 is coupled to the reaction zone R as indicated below to effect an upward flow of the suspension-bearing waste water from the reaction zones into the separating zone S, wherein such water forms a floccular filter bed in the zone S for separating the suspension-borne impurities. In accordance with the invention, aperture 10 has a cross-sectional area which is less than 10% of the maximum cross-sectional area of the separating zone S and less than 10% of the maximum cross-sectional area of the reaction zone R. The resulting purified water, collecting at the upper portion of the zone S at a level indicated at 906, is discharged from the apparatus 900 via conduits 15. The separated suspension is coupled back into the reaction zones R, R' for reprocessing as indicated below, with the excess impurities collecting in the form of sludge at the bottom of the channels 1, 1' to be removed via the conduits 12, 12'.

To effect the separation process, a portion of the agitated streams of waste water in the reaction zone R is introduced, after removal of swirling components in a braking zone 907, into the inlet aperture 10 at the bottom of the separation zone S.

The braking zone 907 is formed as a conduit between the left-hand wall of the zone S and a plate 908, whose upper end is generally parallel to the plate 33 but which diverges therefrom in the region opposite the inlet aperture 10. For this purpose, an aperture 16 is provided in the wall 908 intermediate its ends, such aperture illustratively extending in periodically interrupted fashion, as shown in FIG. 2, along the length of the reaction zones R, R'. The apparatus 900 further includes a wall 32 which extends parallel to the right-hand wall 31 of the separating zone S and which defines, with such wall 31, a recirculation conduit or channel K in accordance with the invention. The upper portion 321 of the wall 32 is disposed at or just slightly below the highest level of separated impurities in the separating zone S, and below the purified water level 907 at the top of the separating zone. With this arrangement, the separated impurities overflow into an inlet end 30 of the conduit K, formed in the region between the upper end 321 of the wall 32 and the adjacent portion of the boundary wall 31. The illustrated sharp angle between the impurity level in the zone S, and the interior of the recirculation conduit K causes a supplemental separation of impurities at the edge 321, so that additional purified water extends toward the overflow conduits 15 in the direction of arrows 911. The re-concentrated impurities, in turn, emerge in the reaction zone R from an outlet end 300 of the conduit K, such outlet being defined between a lower end 322 of the wall 32 and the adjacent lower end of the boundary wall 31. Such emerging impurities are immediately caught up in the high-velocity transverse swirls 901, so that the pressure level at the outlet end 300 is at a relatively low level. Although the wall 32 at its lower end is shown in FIG. 1 as extending through the first opening 10, it is to be understood that the recirculating conduit K need not extend any further downwardly than just above the opening 10 in order for the apparatus to operate satisfactorily.

By comparison, the braking effect, on the waste water, of the zone 907 forming the interface with the inlet conduits 10 of the separating zone S causes the water to enter the zone S at a relatively low velocity; because of this, together with additional factors such as a decrease in upward velocity of flow in the zone S as a function of the monotonically increasing cross-section in such zone in the upward direction, and the weight of the column of fluid in the recirculation channel K, causes a significant pressure drop between the inlet aperture 10 of the zone S and the outlet 300 of the recirculation channel K. Such pressure difference is effective to automatically maintain a flow of impurities into the reaction zone R only through the recirculation channel K, and not in the form of a dropback by gravity through the inlet aperture 10. Becauae of this effect, the floccular layer established in the zone S remains undisturbed as an efficient filtering system, thereby maximizing the degree of separation of the impurities from the waste water.

It has been found advantageous, from the point of view of efficiency, to form serrations along the upper end 321 of the wall 32, as shown in FIG. 3, with the serrations defining a periodic rectangular grid. In addition, it has been found advantageous to corrugate the confronting surfaces of the boundary walls 31, 32 defining the recirculation zone K, such corrugations (represented at 912 in FIG. 4), extending in a direction transverse to the flow of impurities through the conduit K.

Figure 5:
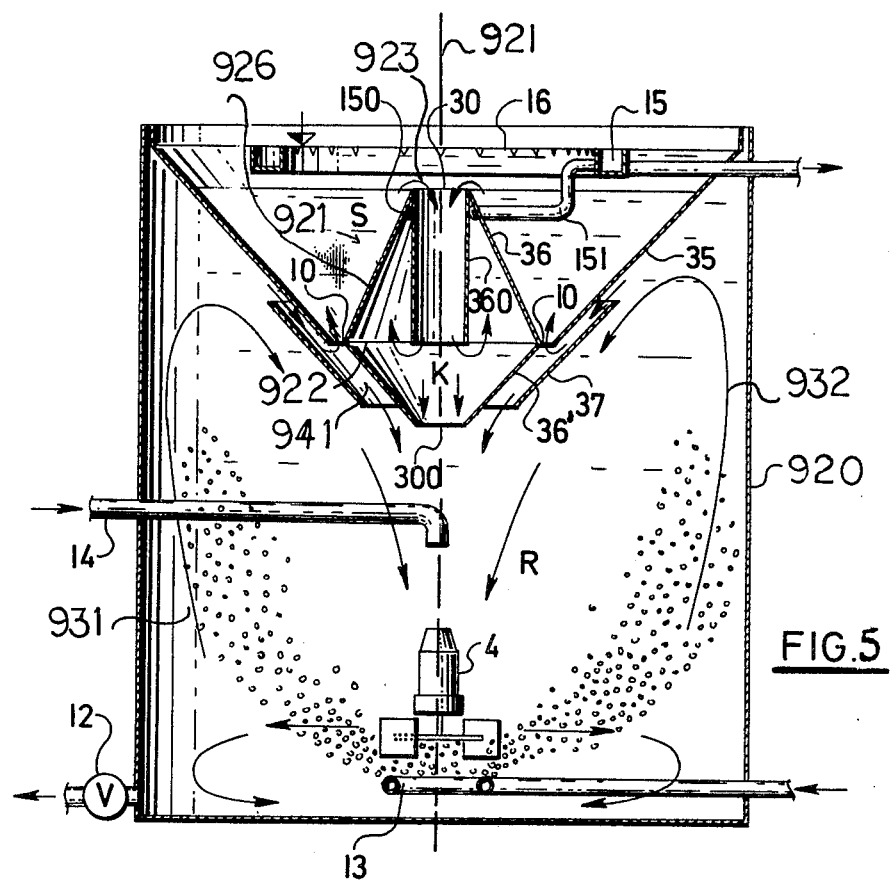
FIG. 5 is an elevation view of a second embodiment of a water purification apparatus constructed in accordance with the invention.

A second embodiment of purification apparatus in accordance with the invention is shown in FIG. 5. In this case, a single, vertically disposed reaction vessel 920 is employed, and the separating zone S is suitably disposed in the upper portion of the cylinder 920 in the form of a hollow, downwardly converging truncated cone 35, concentric with an axis 921 of the cylinder 920. The reaction zone R in such case substantially occupies the remainder of the cylinder 920.

The recirculation conduit K in such arrangement is formed by a hollow, double-conical section 921, which includes an upper, upwardly converging section 36 whose lower end is coextensive with and abuts the upper end of a downwardly converging section 36'. The double portion 921, which is also concentric with the axis 921, is supported in the cylinder 920 so that the surface of abutment (designated 922) of the two portions of the section 921 is transversely spaced from and aligned with the lower end of the conical separating zone S. In such case, the inlet aperture 10 of the separating zone is generally annular in shape.

The lower end 300 of the lower portion 36' of the section 921 forms the outlet of the recirculation channel K, wherein impurities coupled into the channel K are discharged into the high-velocity transverse swirls established on radially opposite sides of the axis 921 in the reaction zone R as indicated below. The inlet portion, designated 30, of the channel K is disposed at or slightly below the highest level of separated impurities in the separating zone S, so that such impurities can overflow into the channel K in the direction of arrows 923.

A rectifying cylinder 360 may advantageously be provided within the double section 921, such cylinder 360 extending from the upper end of the portion 36 to the interface 922 of the portion 36, 36'. At the lower end of such cylinder 360, additional purified water is extracted and coupled into a decanting zone 926 established between the walls of the cylinder 360 and the portion 36. A conduit 150 is disposed in the upper portion of the zone 926 for coupling such purified water to the discharge channel 15 at the upper end of the separating zone S.

The waste water inlet conduit 14 extends through a central portion of the wall of the cylinder 920 to direct water downwardly along the axis 921 toward a tubine 4, which is suitably supported for rotation in the cylinder 920. The effect of rotation of the turbine 4, together with aeration via an underlying conduit 13, is effective to form transverse swirls of waste water 931, 932 in radially opposite portions of the reaction zone R. A portion of the swirl flow 931 is coupled, via a braking region 941, into the inlet aperture 10 of the zone S. The braking zone 941 is analogous to the zone 907 of FIG. 1. An interior boundary of the zone 941 is formed by the longitudinally adjacent lower end of the wall 35 of the zone S and the lower portion 36' of the double section 921. The outer boundary of the zone 941 is formed by a frusto-conical wall 37, which is concentric with the walls 35 and 36'. Access by the stream 931 to the interior of the zone 941 is provided by an inlet 942 between the upper end of the wall 37 and the adjacent lower end of the wall 35.

The manner of providing the required pressure drop between the inlet conduit 10 and the outlet 300 of the recirculation conduit K is entirely analogous to that of FIGS. 1–2, and leads to corresponding results. Thus the cross-sectional area of the opening 10 is less than 10% of the maximum cross-sectional area of the separating zone S and less than 10% of the maximum cross-sectional area of the reaction zone R, thereby producing the required pressure drop between the inlet conduit 10 and the outlet 300 of the recirculation conduit K.

Figure 6:
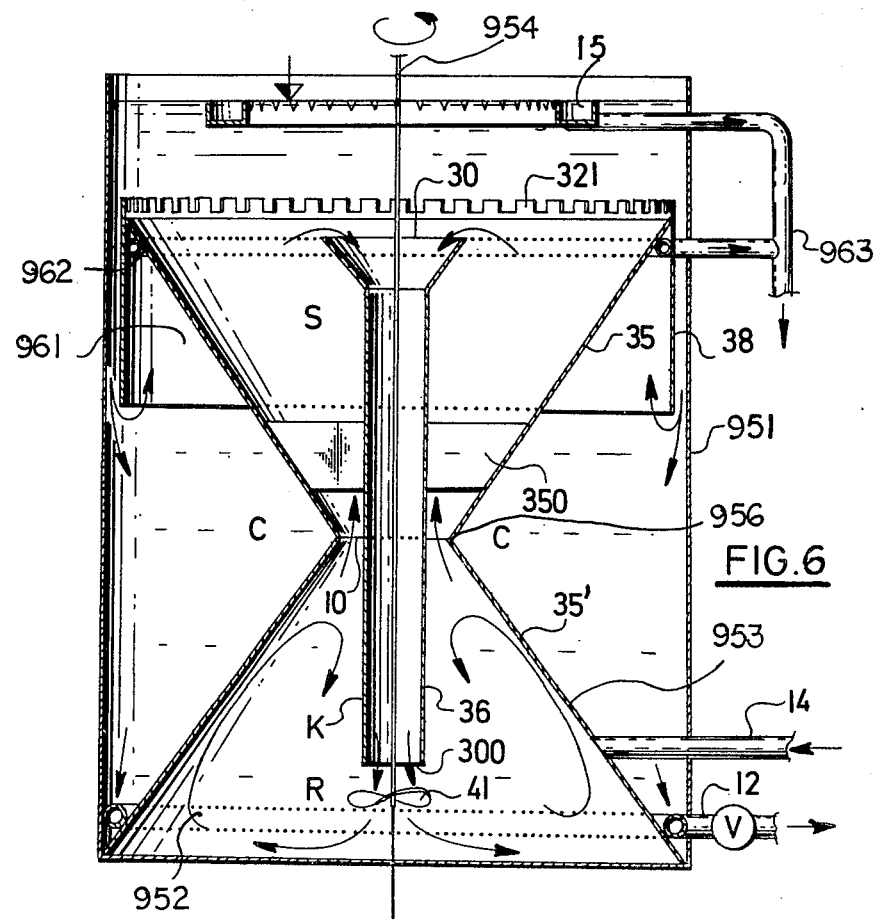
FIG. 6 is an elevation view of a third embodiment of a water purification apparatus constructed in accordance with the invention.

A still further additional embodiment of the purification system of the invention is shown in FIG. 6. In this arrangement, a vertically disposed conduit 951 is employed as the reaction vessel. The separating zone is again formed as a downwardly converging, hollow frustoconical region 35, which overlies and abuts a reaction zone R which is formed as an upwardly converging, hollow frusto-conical region 35'. Opposed transverse swirls 952, 953 of waste water are formed on radially opposite sides of an axis 954 of the cylinder 951, in a manner exactly analogous to the swirls formed in the arrangement of FIG. 5.

The arrangement of FIG. 6 also includes a concentrating zone C defined by the walls 35, 35' and the opposed wall of the cylinder 951.

An interface 956 between the reaction zone R and the overlying separating zone S forms the inlet opening 10 to the separating zone S. The recirculation conduit K in such case is defined by an interior cylindrical section 36, which extends from a point in the zone S at or just below the highest level of separated impurities therein, and terminates at an outlet 300 within the reaction zone R. As indicated, the impurities exiting from the outlet 300 enter the high-velocity swirls 952, 953, established and maintained at least in part by a rotatable agitator 41.

In order to provide a braking and swirl-elimination action on the portion of the waste water in the reaction zone coupled into the separating zone via the opening 10, a suitable system of baffles, identified schematically at 350, may be provided in the lower portion of the zone S directly above the inlet 10.

In the arrangement of FIG. 6, a portion of the separated waste at the top of the zone S overflows around an upper serrated edge 321 thereof into the concentrating zone 951. A rectifying wall 38 extends downwardly into the zone C from the upper portion of the separating zone wall 35, thereby to effect, at its lower end, a further extraction of purified water. Such water is removed, at the top of a decanting zone 961 formed between the walls 35 and 38, by means of a conduit 962 that empties into a clean water discharge pipe 963, which is also coupled to a main clean water discharge conduit 15 at the upper end of the separating zone S.

It will be understood that the manner of recirculation of waste water through the conduit K of FIG. 6, and the establishment of the required pressure drop between the separating zone inlet aperture 10 and the outlet 300 of the conduit K, is analogous to that of FIGS. 1-2 and 5.

In the foregoing, several embodiments of the invention have been described. Many variations and modifications will now occur to those skilled in the art. It is accordingly desired that the scope of the appended claims not be limited to the specific disclosure herein contained.

What is claimed is:

1. A reaction vessel for purifying waste water, said vessel having a wall, comprising first partition means defining a downwardly converging separating zone for separating impurities from the waste water, the first partition means having in its lower portion a first opening for admitting waste water to be advanced upwardly through said separating zone, means having walls including a portion of the vessel wall and cooperating with the first partition means for defining at least one reaction zone having a first region below the separating zone, the cross-sectional area of the first opening being less than 10% of the maximum cross-sectional area of the separating zone and less than 10% of the maximum cross-sectional area of the reaction zone, means in communication with the reaction vessel for admitting waste water into the reaction zone, agitating means disposed in the reaction zone for establishing therein a swirl of the waste water therein, a second interface partition means communicating between the reaction zone and the first opening in the separating zone for directing a portion of the water in the reaction zone toward the first opening and into the separating zone, means disposed at the upper end of the separating zone for discharging purified water, and recirculating means extending downwardly from a portion of the separating zone for feeding back to the first region of the reaction zone a portion of the separated impurities in the separating zone into the swirl of waste water in the reaction zone, the recirculating means being so constructed and arranged that a pressure drop is produced between the first opening and the outlet of the recirculating means to prevent impurities in the separating zone from returning to the reaction zone through the first opening.

2. Apparatus as defined in claim 1, in which the reaction zone defining means comprises first and second transversely spaced, longitudinally coextensive horizontal cylindrical channels in mutual communication at their axially opposed ends; in which the partition means comprise first and second transversely spaced walls extending generally tangentially through transversely confronting upper portions of the respective first and second channels, the second wall projecting into the interior of the first channel, the first wall terminating in spaced relation to the projecting second wall to define the first opening of the separating zone; in which the directing means comprises a third wall extending generally parallel to and coextensive with the first wall to define a first conduit therebetween communicating with the first opening, the third wall having a least one second opening therein to couple water from the first channel into the first opening; and in which the recirculating means comprises a fourth wall extending generally parallel to and coextensive with the projecting second wall to define therebetween a second conduit terminating in the first channel.

3. Apparatus as defined in claim 2, in which the confronting surfaces of the second and fourth walls are corrugated.

4. Apparatus as defined in claim 1, in which the vessel comprises a vertically disposed first cylinder; in which the partition means comprises a first downwardly converging hollow truncated conical wall disposed in the upper portion of the first cylinder coaxial with the axis thereof; in which the reaction zone defining means forms the remainder of the interior of the first cylinder; in which the recirculating means comprises, in combination, a hollow double-conical section comprising a first upper, upwardly converging portion and a second lower, downwardly converging portion, the largest ends of the first and second regions being coextensive and in abutting relation, and means for supporting the double section coaxially of the first wall with the largest surface of such double section being substantially centrally aligned in spaced relation with the lower end of the first wall to define therebetween the first opening; and in which the interface means comprises a second downwardly converging, hollow truncated conical wall surrounding the lower portion of the first wall and the second portion of the double section.

5. Apparatus as defined in claim 4, further comprising a second cylinder extending downwardly from the upper end of the first portion of the double section to define a decanting zone with the surrounding wall of the first portion, and conduit means connecting the upper portion of the decanting zone with the discharge means.

6. Apparatus as defined in claim 1, in which the vessel comprises a vertically disposed first cylinder; in which the partition means comprises a first downwardly converging hollow truncated conical wall in an upper portion of the first cylinder coaxial with the cylinder axis, the lower end of the first wall forming the first opening; in which the reaction zone defining means comprises a second upwardly converging, hollow truncated conical wall disposed in the lower portion of the first cylinder coaxial with the cylinder axis, the smaller end of the first and second walls being coextensive; in which the interface means comprises means for disposing the corresponding smaller ends of the first and second walls in vertically abutting relation; and in which the recirculation means comprises a second vertical cylinder disposed coaxially within the first cylinder and extending downwardly within the first wall through the first opening and terminating within the second wall.

7. Apparatus as defined in claim 6, in which the upper end of the second cylinder is outwardly flared.

8. Apparatus as defined in claim 1, in which at least a portion of the upper surface of the recirculating means is serrated.

9. Apparatus as defined in claim 8, in which the serrations are rectangular in shape.

10. In a method of purifying waste water comprising the steps of agitating a flow of waste water introduced into a reaction zone in a vessel to form a suspension of the impurities in the waste water, flowing a portion of the resulting suspension upwardly through a separating zone in the vessel via an inlet aperture in the vessel leading to the separating zone, wherein the impurities in the separating zone form a flocular layer for separating out the impurities in the suspension as the suspension flows upwardly therethrough, collecting purified water at a discharge point at the top of the separating zone, and coupling a portion of the separated impurities from the separating zone to the reaction zone for reprocessing, the improvement wherein the coupling step comprises providing a recirculation path, independent of such inlet aperture, from an inlet point disposed at an upper portion of the separating zone below the discharge point to an outlet point communicating with the reaction zone, and establishing a pressure drop between such inlet aperture and such outlet point to prevent fluid in the separating zone from returning to the reaction zone through such inlet aperture by restricting the cross-sectional area of the inlet aperture to below 10% of the maximum cross-sectional area of the separating zone and below 10% of the maximum cross-sectional area of the reaction zone.

* * * * *